(12) United States Patent
Shpigelman et al.

(10) Patent No.: US 11,218,413 B2
(45) Date of Patent: Jan. 4, 2022

(54) CONGESTION CONTROL MANAGEMENT METHOD DERIVED FROM PACKETS AT A NETWORK ADAPTER

(71) Applicant: MELLANOX TECHNOLOGIES, LTD., Yokneam (IL)

(72) Inventors: Yuval Shpigelman, Netanya (IL); Roee Moyal, Yokneam Illit (IL); Shahrazad Hleihel, Gush Halav (IL); Kobi Pines, Yaad (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 39 days.

(21) Appl. No.: 16/683,302

(22) Filed: Nov. 14, 2019

(65) Prior Publication Data
US 2021/0152484 A1     May 20, 2021

(51) Int. Cl.
*H04L 1/00*     (2006.01)
*H04L 12/825*     (2013.01)
(Continued)

(52) U.S. Cl.
CPC .......... *H04L 47/263* (2013.01); *H04L 47/283* (2013.01); *H04L 47/326* (2013.01); *H04L 49/9068* (2013.01)

(58) Field of Classification Search
CPC ... H04L 47/263; H04L 47/283; H04L 47/326; H04L 49/9068; H04L 12/26; H04L 47/27; H04L 12/801
See application file for complete search history.

(56) References Cited

U.S. PATENT DOCUMENTS

| | | | |
|---|---|---|---|
| 6,741,555 B1 * | 5/2004 | Li | H04L 47/10 370/229 |
| 7,000,025 B1 * | 2/2006 | Wilson | H04L 47/31 709/235 |

(Continued)

FOREIGN PATENT DOCUMENTS

EP     2916521 A1     9/2015

OTHER PUBLICATIONS

Almeida et al., "Explicit rate congestion control with binary notifications", 10th IEEE Workshop on Local and Metropolitan Area Networks, pp. 1-10, Nov. 21-24, 1999.

(Continued)

*Primary Examiner* — Abdelnabi O Musa
(74) *Attorney, Agent, or Firm* — Kligler & Associates Patent Attorneys Ltd

(57) ABSTRACT

A network adapter includes a receive (RX) pipeline, a transmit (TX) pipeline, hardware-implemented congestion-control circuitry, and a congestion-control processor. The RX pipeline is configured to receive packets from a network and process the received packets. The TX pipeline is configured to transmit packets to the network. The hardware-implemented congestion-control circuitry is configured to receive, from the TX pipeline and from the RX pipeline, Congestion-Control (CC) events derived from at least some of the packets transmitted to the network and from at least some of the packets received from the network, and to pre-process the CC events. The congestion-control processor is configured to receive the pre-processed CC events from the congestion-control circuitry, and to throttle a transmission rate of the packets transmitted to the network by the TX pipeline responsively to the pre-processed CC events.

21 Claims, 8 Drawing Sheets

(51) Int. Cl.
*H04L 12/841* (2013.01)
*H04L 12/823* (2013.01)
*H04L 12/861* (2013.01)

(56) References Cited

U.S. PATENT DOCUMENTS

| | | | |
|---|---|---|---|
| 7,035,220 B1* | 4/2006 | Simcoe | H04L 47/10 |
| | | | 370/236 |
| 2007/0070901 A1 | 3/2007 | Aloni et al. | |
| 2007/0248013 A1* | 10/2007 | Sridharan | H04L 47/2475 |
| | | | 370/235 |
| 2015/0009817 A1* | 1/2015 | Sato | H04L 47/25 |
| | | | 370/230.1 |
| 2017/0093699 A1* | 3/2017 | Crupnicoff | H04L 47/33 |
| 2017/0149666 A1* | 5/2017 | Kiykioglu | H04L 47/27 |
| 2020/0334195 A1* | 10/2020 | Chen | H04L 67/1097 |

OTHER PUBLICATIONS

Ramakrishnan et al., "The Addition of Explicit Congestion Notification (ECN) to IP", Request for Comments: 3168, pp. 1-63, Sep. 2001.
EP Application # 20207427.4 Search Report dated Apr. 7, 2021.

* cited by examiner

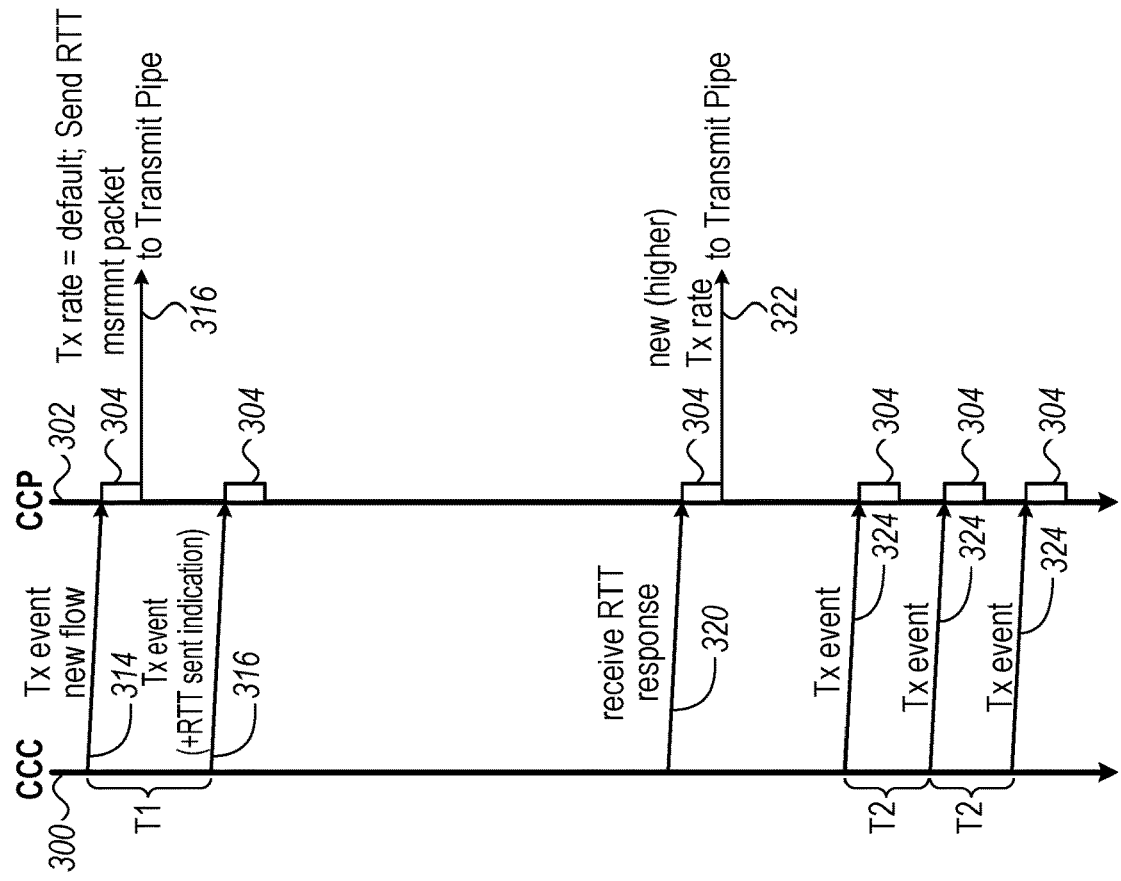
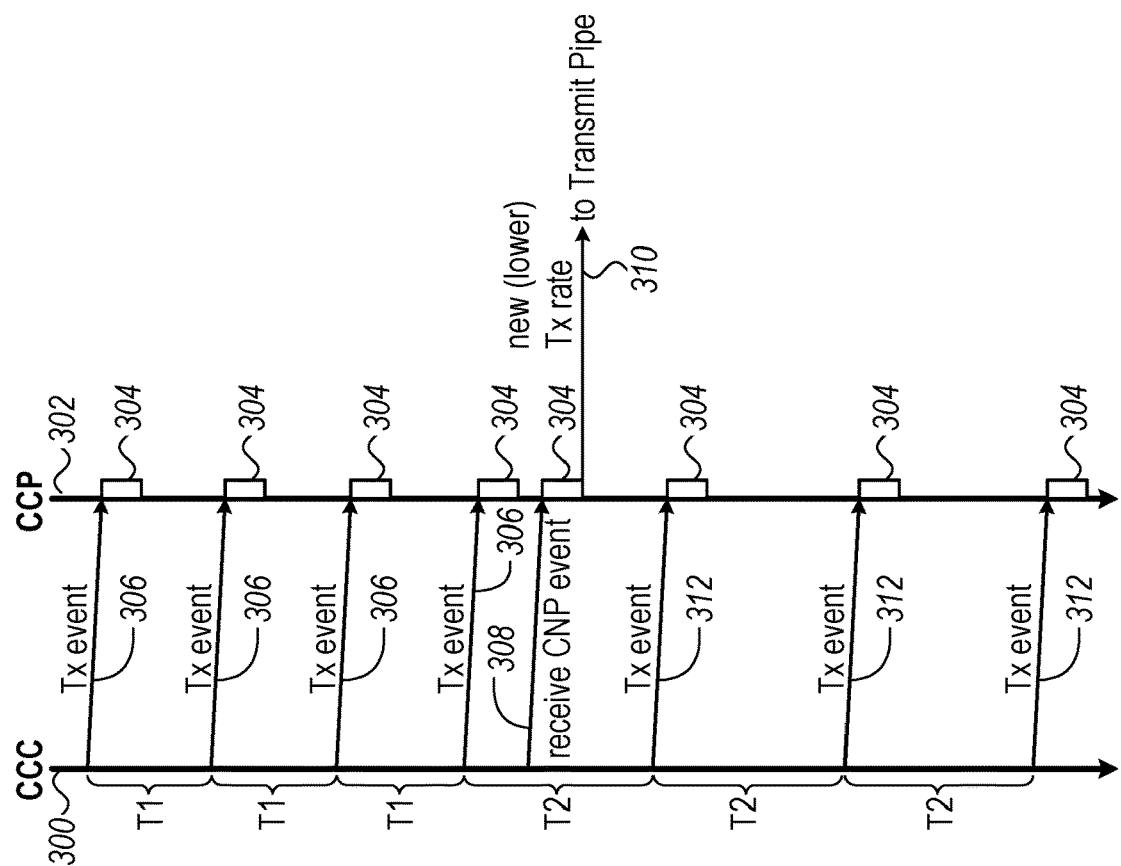

CONGESTION CONTROL MANAGEMENT METHOD DERIVED FROM PACKETS AT A NETWORK ADAPTER

FIELD OF THE INVENTION

The present invention relates generally to packet communication networks, and particularly to methods and systems for congestion control in such networks.

BACKGROUND OF THE INVENTION

Congestion management of packet traffic in communication systems is important as poor congestion control may significantly impact system performance.

Some congestion control techniques are used in the industry, for example, "Explicit rate congestion control with binary notifications," by Almeida and Belo, 10th IEEE Workshop on Local and Metropolitan Area Networks, Nov. 21-24, 1999, describes a rate-based source adaptation algorithm for packet-switching network, in which binary notifications are sent to the sources, reflecting a positive or negative difference between the source rate and the estimated fair rate, and based on these notifications, the sources increase or decrease the transmit rate.

Internet Engineering Task Force (IETF) RFC 3168, entitled "The Addition of Explicit Congestion Notification (ECN) to IP," September, 2001, specifies the incorporation of ECN (Explicit Congestion Notification) to TCP and IP, including ECN's use of two bits in the IP header.

SUMMARY OF THE INVENTION

An embodiment of the present invention that is described herein provides a network adapter including a receive (RX) pipeline, a transmit (TX) pipeline, hardware-implemented congestion-control circuitry, and a congestion-control processor. The RX pipeline is configured to receive packets from a network and process the received packets. The TX pipeline is configured to transmit packets to the network. The hardware-implemented congestion-control circuitry is configured to receive, from the TX pipeline and from the RX pipeline, Congestion-Control (CC) events derived from at least some of the packets transmitted to the network and from at least some of the packets received from the network, and to pre-process the CC events. The congestion-control processor is configured to receive the pre-processed CC events from the congestion-control circuitry, and to throttle a transmission rate of the packets transmitted to the network by the TX pipeline responsively to the pre-processed CC events.

In an embodiment, the network adapter further includes a direct hardware-implemented point-to-point interface configured to transfer at least some of the pre-processed CC events from the congestion-control circuitry to the congestion-control processor.

In some embodiments, the congestion-control circuitry includes an event queue configured to queue the CC events, and circuitry configured to pre-process the queued CC events. In an embodiment, the circuitry is configured to discard one or more of the queued CC events, and to provide to the congestion-control processor only the CC events that were not discarded. In another embodiment, the circuitry is configured to coalesce two or more of the queued CC events, and to provide the coalesced CC events to the congestion-control processor.

In a disclosed embodiment, the congestion-control processor supports an Application Programming Interface (API) for receiving user-defined Congestion-Control (CC) software code, and to throttle the transmission rate by running the CC software code.

In some embodiments, the congestion-control circuitry is further configured to transmit via the TX pipeline a first Round-Trip Time (RTT) packet, and to receive via the RX pipeline a second RTT packet that was sent from a peer network adapter in response to the first RTT packet, and the congestion-control processor is configured to estimate, based on the first and second RTT packets, a round-trip propagation time between the network adapter and the peer network adapter, and to throttle the transmission rate depending on the round-trip propagation time.

There is additionally provided, in accordance with an embodiment of the present invention, a network adapter including a receive (RX) pipeline, a transmit (TX) pipeline, and hardware-implemented circuitry. The RX pipeline is configured to receive packets from a network and process the received packets. The TX pipeline is configured to transmit packets to the network. The hardware-implemented circuitry is configured to receive from the RX pipeline a first Round-Trip Time (RTT) packet sent from a peer network adapter, to generate a second RTT packet in response to the first RTT packet, and to send the second RTT packet to the TX pipeline for transmission to the peer network adapter.

In some embodiments, the hardware-implemented circuitry is configured to insert in the second RTT packet one or more timestamps indicative of a time difference between (i) arrival of the first RTT packet at the network adapter and (ii) departure of the second RTT packet from the network adapter.

There is additionally provided, in accordance with an embodiment of the present invention, a method including, using a receive (RX) pipeline of a network adapter, receiving packets from a network and processing the received packets, and transmitting packets to the network using a transmit (TX) pipeline of the network adapter. Using hardware-implemented congestion-control circuitry in the network adapter, Congestion-Control (CC) events, which are derived from at least some of the packets transmitted to the network and from at least some of the packets received from the network, are received from the TX pipeline and from the RX pipeline. The CC events are pre-processed by the hardware-implemented congestion-control circuitry.

Using a congestion-control processor in the network adapter, the pre-processed CC events are received from the congestion-control circuitry, and a transmission rate of the packets transmitted to the network is throttled by the TX pipeline responsively to the pre-processed CC events.

There is further provided, in accordance with an embodiment of the present invention, a method including, using a receive (RX) pipeline in a network adapter, receiving packets from a network and processing the received packets, and transmitting packets to the network using a transmit (TX) pipeline of the network adapter. Using hardware-implemented circuitry in the network adapter: (i) a first Round-Trip Time (RTT) packet sent from a peer network adapter is received from the RX pipeline, (ii) a second RTT packet is generated in response to the first RTT packet, and (iii) the second RTT packet is sent to the TX pipeline for transmission to the peer network adapter.

The present invention will be more fully understood from the following detailed description of the embodiments thereof, taken together with the drawings in which:

BRIEF DESCRIPTION OF THE DRAWINGS

FIG. 3A is a timing chart that schematically illustrates receipt of a Congestion Notification Packet (CNP) in a congestion control scenario, according to embodiments of the present invention;

FIG. 3B is a timing chart that schematically illustrates the starting of a new flow of packets in a congestion control scenario, according to embodiments of the present invention;

DETAILED DESCRIPTION OF EMBODIMENTS

Overview

Figure 1:
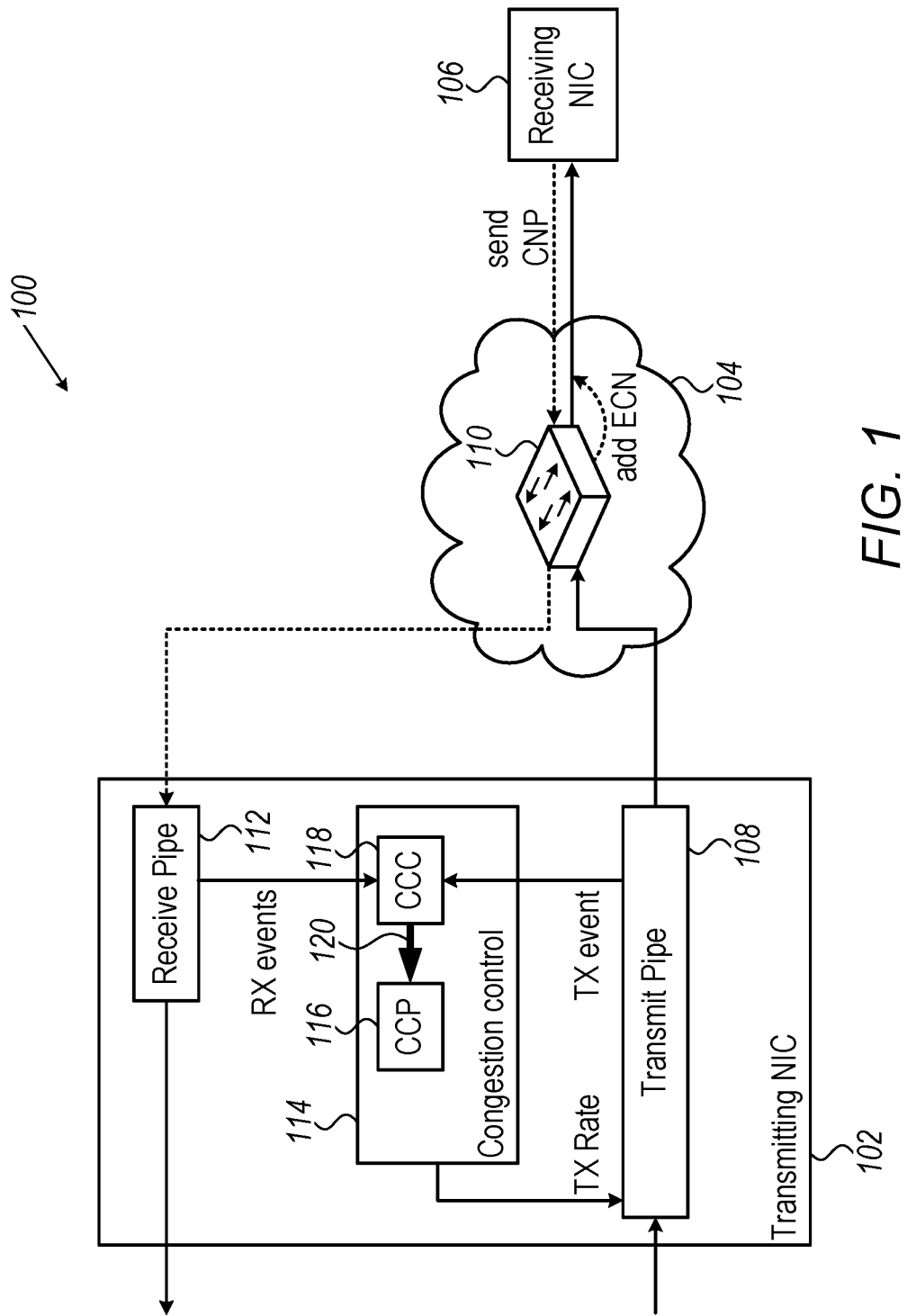
FIG. 1 is a block diagram that schematically describes a Remote Direct Memory Access (RDMA) over Converged Ethernet (RoCE) architecture with congestion mitigation, in accordance with an embodiment of the present invention.

Transmission Control Protocol (TCP) was introduced in 1974, but its Congestion Control (CC) algorithms keep evolving. CC algorithms change the transmit rate of packets from a source that transmits packets (e.g., a network adapter in a source node), in response to congestion notifications that the source receives. Congestion notifications are typically added to a packet stream (either as a separate packet, or as an additional information on an existing packet). When the packets reach their destination (e.g., a network adapter in a destination node), the destination sends the congestion notifications back to the source, which may decrease the transmit rate in response to the notification (or increase the rate if no congestion notifications are received).

Numerous CC algorithms have been (and still are) suggested, pertaining to the setting of the transmit rate in response to congestion notifications (see, for example, U.S. Pat. No. 7,000,025). The algorithms are typically flow-oriented, and the rate of each flow of packets is independently controlled, in response to congestion notifications pertaining to packets of the same flow.

Congestion Control (CC) algorithms are conventionally executed by software that runs on a host processor, or, by dedicated hardware. There are some major disadvantages to software implementation on a host. First, host software implementations typically exhibit long latency caused by the context switching required to handle congestion notifications; secondly, host software implementations consume significant CPU resources; and, lastly, algorithms that are executed by host software require communication between the network adapter and the host, over a bus. On the other hand, software implementations are typically flexible, allowing easy adaptations to new CC algorithms and to changing network configurations, whereas hardware implementations tend to be rigid and hard to modify.

Embodiments according to the present invention that are disclosed herein provide network adapters with congestion control that are both flexible and fast. (The description that follows refers mainly to Network Interface Controllers (NICs) for the sake of clarity. The disclosed techniques, however, are in no way limited to Ethernet NICs; in embodiments according to the present invention, any other suitable network adapter may be used, including, for example, InfiniBand® Host Channel Adapters (HCAs)).

In some embodiments, a NIC comprises a Congestion-Control Circuitry ("CCC" hereinbelow) and a dedicated congestion control programmable processor ("CCP", also referred to as "processor") that is tightly coupled to the communication ports. The processor may throttle (decrease or increase) the transmit rate of packets, responsive to the network's traffic load. In embodiments, the NIC is configured to send, return and receive Round-Trip-Delay (RTT) Measurement packets, which may be useful for the setting of the transmit rate (to be described below).

The NIC typically comprises one or more ingress ports, that receive packets from a network and send the packets to an input queue; and one or more egress ports, that receive packets from an output queue and send the packets to the network. In the description hereinbelow, we will refer to the aggregation of the ingress ports and the input queue as Receive Pipe, and to the aggregation of the output queue and the egress ports as Transmit Pipe.

In an embodiment, the CCC comprises an events queue, which is configured to receive TX and RX notifications pertaining to sending and receiving of packets, respectively, and to send the events notifications to the CCP. The CCC typically receives TX notifications for each predefined burst of sent packets, and RX notifications for the following received packets: positive and negative acknowledgment (ACK and NACK) packets; congestion notification packets (packets that are sent back by a peer network adapter in response to the sent packets); and returned RTT measurement packets.

In some embodiments, to avoid congestions in the events queue, the CCC is configured to discard (drop) some of the events, responsive to the occupancy of the queue (this congestion is not to be confused with congestion in the network).

We will refer, in some of the example embodiments below, to Remote Direct Memory Access (RDMA) over Converged Ethernet (RoCE); however, the techniques disclosed herein are not limited to RoCE, and may be used in any suitable network configurations.

According to some embodiments, the event types that are stored in the event queue comprise:
1. TX—sending of a burst of packets;
2. CNP—receiving of a Congestion Notification Packet (CNP);
3. NACK—receiving of NACK;
4. ACK—receiving of ACK;
5. RTT—receiving a response packet to a Round-Trip-Delay (RTT) measurement packet (will be described below); and
6. Host injected events (will be described below).

In some embodiments, events are represented in the CCC queue by entries that comprise an event-type field, a time-stamp field, a serial-number field, a flow-identification field, a field representing the number of sent bytes for a Tx event, and fields for additional RTT-receipt-event time stamps.

In some embodiments according to the present inventions, CC events comprise, in addition to events that are generated by the Tx and Rx pipes, events that the Firmware generates, which may be defined by a user of the NIC and provide algorithm flexibility.

In some embodiments according to the present invention, the CCC comprises an arbiter (e.g. round robin), which selects an event to be processed from the events queue, or a firmware event. In some embodiments, the number of event types may be larger than the number of event types that the CCC can handle, and a mapping may be employed, which maps more than one event type to the same "event class".

According to some embodiments of the present invention, the CCC further comprises a CCP-Control unit (also referred to simply as "CCP control" for brevity), which is configured to coalesce CC evets, and to submit events and coalesced events to the CCP, as inputs for the CC algorithms that the CCP executes. In an embodiment, the CCP Control comprises a Content-Addressable memory (CAM), which receives congestion events from the congestion queue.

The CAM is configured to compare the flow indexes of congestion events to the indexes of flows that are already allocated to processors of the CCP (the number of indexes that are stored in the CAM being no greater than the number of processors in the CCP), and to point at the processor for which the flow indexes match; or, to indicate "no match" if no match is found.

In embodiments, The CCP Control further comprises CCQ Slices (one slice for each CCP processor) and a slice-arbitrator, wherein each slice comprises a Finite State Machine (FSM), the FSM comprising an Idle State, a Busy state and an Arbitrating state. Starting from the Idle state, the CCQ Slice enters the Arbitrating state when the CCQ Slice receives an event; the slice-arbitrator decides which of the slices at Arbitrating state will activate a CCP processor that is not busy; the CCQ slices selected by the Arbitrator then enters the Busy state, and returns to Idle state when the corresponding processor signals completion (as will be described hereinbelow, the CCQ slices comprise additional states, to support coalescing). In an embodiment, the CCP control will send to the CCP the index of the processor selected by the slice arbitrator, the corresponding flow index and, optionally, a hashing of the flow index.

In some embodiments, when a CCP processor updates the rate and/or requests an RTT measurement, the CCP sends the rate and the request with the processor ID; the CCP control is configured to read the flow tag corresponding to the processor ID (from the CAM) and to send the flow tag with the updated rate and/or the RTT request to the Transmit Pipe.

Coalescing

In some embodiments, to increase the performance, the CCP Control comprises a coalescing circuitry that is configured to compress a plurality of congestion events, which correspond to the same flow and the same event class, to a single "coalesced event". When such a coalesced event is assigned to a processor, the processor will process the coalesced event, rather than each of the original events individually. Thus, efficiency of the congestion processing is increased, as less context switching (that is associated with assigning a new task to a processor) is required. Moreover, with coalescing, the case wherein events that correspond to a first flow and are waiting for a processor, block events that correspond to other flows, is avoided.

In an embodiment, the CCP Control further comprises a Coalescing Unit and an FF array. The FF Array comprises, for every processor of the CCP and every event class, an entry, in which the accumulated data of all coalesced events that correspond to the same processor and class are stored. When a new event is received, the Coalescing unit updates the corresponding entry in the FF Array. For example, FF Array entries comprise Sent-Bytes fields which count the number of bytes in sent-packets events that the Transmit Pipe generates. When the CCC receives a new sent-packet event, the Coalescing Unit will increment the Sent-Bytes field of the corresponding FF Array entry accordingly. In another example, each FF Array entry comprises a First Serial Number (SN) field and a Last SN field. When a first event is coalesced, the SN of the event is stored in the First SN field and in the Last SN field of the corresponding FF Array entry; when further events are coalesced into the same FF Array entry, only the Last SN field will be updated.

In embodiments, each CCQ slice further comprises a More-Work state, and when a new event is coalesced into an existing FF Array entry, the corresponding CCQ slice will enter the More Work state; when the corresponding processor will signal completion, the CCQ slice will re-enter the Arbitrating state, requesting a CCP processor.

In some embodiments, Firmware can override the CCP processors, and each CCP slice comprises additional states to support firmware override and firmware-release.

CCP

In embodiments, the CC algorithms that the CCP runs comprise a plurality of concurrent processes, wherein each process controls congestion in a single flow of packets. Each process is configured to receive events pertaining to the corresponding flow, update the rate (and, possibly, request RTT measurements), and then pause until the next event is received. To allow execution by a limited number of processors, each process is assigned a context in memory; a process may be paused by storing the context and resumed by reading the stored context (as the number of possible contexts may be large, contexts pertaining to flows that are not active are typically stored in a slower memory, and read by the processor when needed).

According to some embodiments, the CCP comprises a plurality of independent processors, and events that the CCC sends to the CCP for processing are allocated to processors that are not busy. A processor that is assigned to handle an event, reads the corresponding context, and then runs the process, possibly changing the transmit rate for the flow and/or requesting RTT measurements, and, lastly, stores the updated context, in preparation for the processing of the next event.

RTT

In embodiments according to the present invention, reliable measurement of packet round trip delay (RTT) is an important parameter for the CC algorithm. RTT measurement is typically done by calculating the time difference from the sending of a packet to the receiving a of corresponding ACK; however, such measurement technique is not accurate, because the ACK is initiated by the processor, and the RTT measurement will include the time it takes for the software to respond.

Some embodiments according to the present invention support RTT measurement packets, which are sent from a Sender Network Interface Controller (NIC) to a Receiver NIC, which returns the packet to the Sender NIC. The sender-NIC adds a first timestamp to the sent packet; the receiver-NIC adds a second timestamp to the packet when the packet is received, routes back the packet to the Sender-NIC, and adds a third timestamp when the packet is sent back. The Sender-NIC can then, by observing the three time stamps (and the time in which the return packet arrives), accurately calculate the RTT, breaking it to segments, including time from sender-NIC to receiver-NIC, time within the receiver-NIC, time (of the return packet) from receiver-NIC to sender-NIC.

System Description

FIG. 1 is a block diagram that schematically describes an RoCE architecture 100 with congestion mitigation, in accordance with an embodiment of the present invention. A transmitting NIC 102 transmits packets over a network 104 to a receiving NIC 106. (It should be noted that both the transmitting NIC and the receiving NICs are configured to both transmit and receive packets; the terms "transmitting" and "receiving" hereinabove refer to the direction in which congestion is mitigated.)

Transmitting NIC 102 comprises a Transmit (TX) Pipe 108, which queues and arbitrates packets that the NIC transmits and sends the packets to Network 104. The network comprises, according to the example embodiment illustrated in FIG. 1, a Switch 110, which, when congested, marks packets the transmitting NIC sends with an Explicit Congestion indication (ECN).

Receiving NIC 106 sends return packets back to the transmitting NIC, including packets that are used for congestion control (designated by dashed lines in FIG. 1), such as CNP packets, ACK/NACK packets, and RTT measurement packets (to be described below). When the Receiving NIC receives a packet with ECN indication, the receiving NIC sends a CNP packet back to the sending NIC.

Transmitting NIC 102 further comprises a Receive (RX) Pipe 112, which receives incoming packets from the network, and a Congestion Control unit 114.

Congestion Control 114 is configured to execute congestion control algorithms and mitigate congestion in the RoCE transmit path. The Congestion Control comprises a Congestion Control Processor (CCP) 116, which is configured to run congestion control algorithms, and a Congestion Control Circuitry (CCC) 118, which is configured to send congestion events to the CCP.

CCC 118 receives Tx events when Transmit Pipe 108 sends bursts of packets, and Rx events when Receive Pipe 112 receives congestion control packets. (The received congestion control packets may include, for example, ACK and NACK that are received in response to transmitted packets, CNP packets that the receiving NIC generates in response to receiving ECN-marked packets, and RTT measurement packets.)

The CCC queues the events and sends at least some of the events to the CCP over a hardware-implemented direct point-to-point interface 120. In the present context, the term "direct point-to-point interface" means an interface that does not involve communication over a bus, an interrupt or any other operating system invocation. The CCP processes the events and runs congestion control algorithms to calculate the required transmission rate for further packets, and then informs the rates to Transmit Pipe 108 and, optionally, requests that the Transmit Pipe send an RTT measurement packet.

In some embodiments, the CCP runs the congestion control algorithms separately for each flow of packets, and the transmission rate is determined separately for each flow.

In embodiments according to the present invention, communication between the CCC and the CCP does not involve operating system calls—the CCP signals that it is ready to process events (e.g., by asserting a dedicated signal) and then reads the event on an input bus that the CCC drives.

Thus, according to the example embodiment of FIG. 1, congestion events are queued in by dedicated circuitry, and submitted to a dedicated processor that runs congestion control algorithms, modifying the transmit rate accordingly. The overhead associated with running the algorithms is small, and flexibility to changing congestion control algorithms is preserved.

As would be appreciated, the configuration of RoCE architecture 100 is an example configuration that is depicted purely for the sake of conceptual clarity. Other suitable configurations may be used in alternative embodiments of the present invention. For example, instead of (or in addition to) RoCE, the architecture may be TCP and/or converged Non-Volatile-Memory (NVM) storage (e.g., hyper-converged NVM-f). Congestion events that CCC 118 receives may be pre-sorted by additional hardware or software; the rate at which the Transmit-Pipe sends the packets may be jointly controlled by CCP 116 and by other algorithms of transmitting NIC 102.

Figure 2:
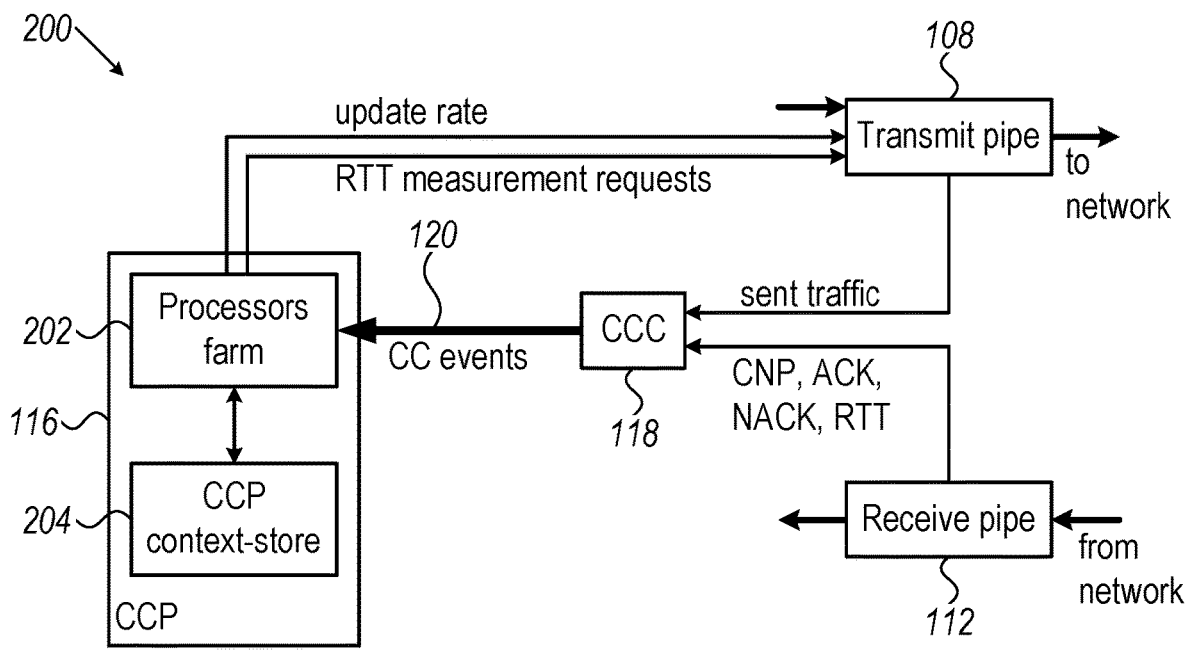
FIG. 2 is a block diagram that schematically illustrates the structure of a transmitting Network Interface Controller (NIC), according to embodiments of the present invention.

FIG. 2 is a block diagram 200 that schematically illustrates the structure of transmitting NIC 102, according to embodiments of the present invention. (For clarity, it should be noted that a Transmitting NIC and a Receiving NIC may be identical or similar, but the congestion control circuitry is activated when the NIC functions as a transmitting NIC. Moreover, when both directions are congested, the same NIC may be configured as a Transmitting NIC and a Receiving NIC, at the same time.)

The Transmitting NIC comprises a Transmit Pipe 108, a Receive Pipe 112, a Congestion Control Processor (CCP) 116 and a Congestion Control Circuitry (CCC) 118 (the units above were described with reference to FIG. 1).

Transmit Pipe 108 sends notifications pertaining to packets that the NIC transmits to the CCC. In an embodiment, the Transmit Pipe sends notifications pertaining to bursts of transmitted packets; in other embodiments, only notifications pertaining to a predefined subset (e.g., to packets that egress through a predefined port) are sent.

Receive Pipe 112 sends congestion control notifications to the CCC. In the example embodiment of FIG. 2 such notifications include Congestion Notification Packets (CNP) that are sent back to the sending NIC by a receiving NIC (e.g., NIC 106 of FIG. 1), ACK packets, NACK packets, and RTT measurement packets. In some embodiments, the CCC receives only some of the notifications; e.g., according to the Ingress port that receives the notifications.

The CCC queues notifications from the Receive and the Transmit pipes, pre-processes the events and then forwards Congestion Control (CC) events, through a direct point-to-point interface 120, to the CCP. In embodiments according to the present invention, the CC events that the CCC outputs are typically not identical to CC events that the CCC receives; rather, the output events may be diluted, coalesced and transformed, as will be explained below.

CCP 116 runs CC algorithms. The CC events that the CCC outputs are input to the CCP. From time to time the CCP may alter the transmit rate, according to the algorithm. Occasionally, the CCP may request that the Transmit Pipe send an RTT measurement packet.

CCP 116 comprises a Processor-Farm 202, which comprises a plurality of processors, and a CCP Context Store 204 (typically a RAM). According to embodiments, the CC algorithms run for each flow of packets separately; whenever a new event is received from the CCC, the algorithm reruns and updates the transmit rate for the corresponding flow, responsive to the new event (if a flow for each there is no context is encountered, the processor starts from an initial context). In the example embodiment illustrated in FIG. 2, each flow is assigned a context in the CCP Context Store; the context comprises all data that is needed in order to continue the execution of the CC algorithm after the execution stops.

When a new CC event is received from the CCC, the event is assigned to one of the processors of the Processors Farm. The processor then reads the context that corresponds to the flow of the event, and continues running the CC algorithm, updating the rate calculation responsive to the new event. When the processor completes the calculation of the updated rate, the processor sends the rate to Transmit Pipe 108, stores the updated context in CCP Context Store 204, and stops (or else directly starts processing a new event).

As the number of possible flows is large, it may not be practical to store all contexts in CCP context store 204. Instead, the context of some of the less active flows may be stored in a larger (and slower) memory and loaded to the CCP context store when needed. In some embodiments CCP context store 204 comprises a cache memory, which is updated from a main memory upon a cache miss.

In summary, the CCC receives notifications pertaining to transmitted packets from the Transmit Pipe, and notifications pertaining to congestion-control packets from the Receive Pipe. The CCC queues the events and output preprocessed events to the CCP. The CCP comprises a plurality of processor and a context store; each processor that gets an event reads the corresponding context (that is—the context pertaining to the same flow of packets) and runs the CC algorithm. As the value of the RTT may be required by the algorithm, the processor may request transmission of RTT measurement packets. The processor updates the transmit rate, and, when done, stores its context in the context store.

Interface between the CCC and the CCP is efficient, as no operating system call is needed; context read and write are typically done in one to four clock cycles.

As would be appreciated, the structure of CCC 118 and CCP 116 as illustrated in FIG. 2 are cited by way of example. Congestion Control Circuitry and Congestion Control Processors in accordance with the disclosed techniques are not limited to the description hereinabove. In alternative embodiments, for example, more events may be monitored, such as an Rx event upon every received packet. In some embodiments, the CCC may be embedded within the Transmit Pipe. In other embodiments, each processor of the processors farm may have its own context store; in other embodiments, each processor may have a cache memory for frequently used contexts.

FIG. 3A is a timing chart that schematically illustrates receipt of a CNP in a congestion control scenario, according to embodiments of the present invention. The time chart comprises a CCC time axis 300 and a CCP time axis 302, which illustrate events that occur in the CCC and the CCP (118 and 116 in FIG. 1), respectively.

It should be noted that the timing chart illustrates only packets that pertain to a specific flow; packets pertaining to other flows may be concurrently received and processed, but are not shown in FIG. 3A, for clarity.

The timing chart starts (at the top), when the CCC sends a send-event 306 to the CCP. A processor of the CCP will then enter a CC-algorithm execution period 304. In the example embodiment of FIG. 3A, the transmit rate remains unchanged. Next, the CCC sends three more send-burst events 306, and, responsively, the CCP runs the CC algorithm three more times (possibly gathering statistics, but without changing the rate). The time interval between send-burst events 306 is fixed T1, as the transmit rate is unchanged.

Now, a switch between the transmitting NIC and the receiving NIC becomes congested and marks the packet with an ECN. The receiving NIC routes the CNP packet back to the transmitting NIC, wherein it is received by the Receive Pipe and signaled to the CCC. In response, the CCC sends a Receive CNP event 308 to the CCP. The CCP will again, enter a CC algorithm execution period 304, but this time the algorithm will calculate a lower transmit rate, in response to the CNP. The CCP will then send a new Transmit Rate notification 310 (which may be lower than the previous rate) to the Transmit Pipe, which will, in response, increase the time interval between the transmission of packets. The Transmit Pipe will send the following packets (and the CCC will send the corresponding send-packet events to the CCP) at a lower rate, with distance of T2 between the transmissions (T2>T1).

Note that in the example above, the change of rate is immediate, and occurs at the next burst after the CNP is received. In embodiments, the CNP may be received late, and the next packet will still be transmitted after T1; the new rate will take effect in one of the following packets.

FIG. 3B is a timing chart that schematically illustrates the starting of a new flow of packets in a congestion control scenario, according to embodiments of the present invention. Like in FIG. 3A, the time chart comprises a CCC time axis 300 and a CCP time axis 302; and shows only events pertaining to the flow of interest.

The time-chart starts when the CCC sends a Send-burst event 314 to the CCP. The corresponding context does not exist in CCP Context-Store 204 (FIG. 2)—it is either new or has been replaced in the Context Store by a more active context. Next, the CCP sends an indication 316 to the Transmit Pipe, wherein the CCP sets the rate to a preset default rate and asks the CCC to send an RTT Measurement packet.

The Transmit Pipe now sends a first burst. At the end of the burst, the Transmit Pipe adds an RTT request packet. The CCC received a Tx Event 316 with RTT-sent indication after T1. The CCP runs the CC algorithm, but, lacking new information, does not change the transmit rate.

As will be described hereinbelow, the RTT measurement packet travels through the network to the receiving NIC, which adds timestamps and directs the packet back to the sending NIC. When the sending NIC receives the returned RTT measurement packet, the CCC sends an RTT-response-received notification 320 to the CCP. The CCP reenters CC algorithms execution 304 and, in response to the RTT measurement, calculates a new value for the transmit rate. In the example embodiment illustrated in FIG. 3B, the rate should be faster than the default (for example, if RTT measurement detected a short round-trip delay), and the CCP sends a new Transmit-Rate command 322 to the Transmit Pipe, with a value that is higher than the default rate. The Transmit Pipe sends the next packets (and the CCP will send the corresponding sent-packet notifications) at a higher rate, with a delay of T2 (T2<T1).

In summary, when a new flow (or a flow that has no context in the context store) starts, the Transmit Queue sends the packet at a default rate; the CCP requests the Transmit Pipe to initiate an RTT measurement. When the RTT measurement response packet arrives, the algorithm calculates the desired transmit rate, and updates the Transmit Pipe accordingly.

As would be appreciated, the order of events that take place in a transmitting NIC, as illustrated in FIGS. 3A, 3B and described above, is cited by way of example. Transmitting NICs and CC algorithms in accordance with the disclosed techniques are not limited to the description hereinabove. In alternative embodiments, for example, the transmit rate may be set by a combination of CNP events, RTT measurements, ACK and NACK packets; in other embodiments the rate may change when no events are received, for example, the rate may increase by default, for better performance. In some embodiments, when a new rate is calculated, the CCP will change the rate gradually; e.g., to lower the rate the CCP may multiply the rate by a factor smaller than one, in each of the next packets.

RTT Measurement

The value of RTT—round-trip-delay—in a network configuration such as RoCE, may be an important parameter for CC algorithms. Embodiments according to the present invention that are disclosed herein provide for an efficient and accurate method to measure the RTT, i.e., the round-trip propagation time between the transmitting NIC and the receiving NIC. Transmitting NICs are configured to send RTT measurement packets with a timestamp, and receiving NICs are configured to add timestamps and return the measurement packet to the Transmitting NIC.

Figure 4:
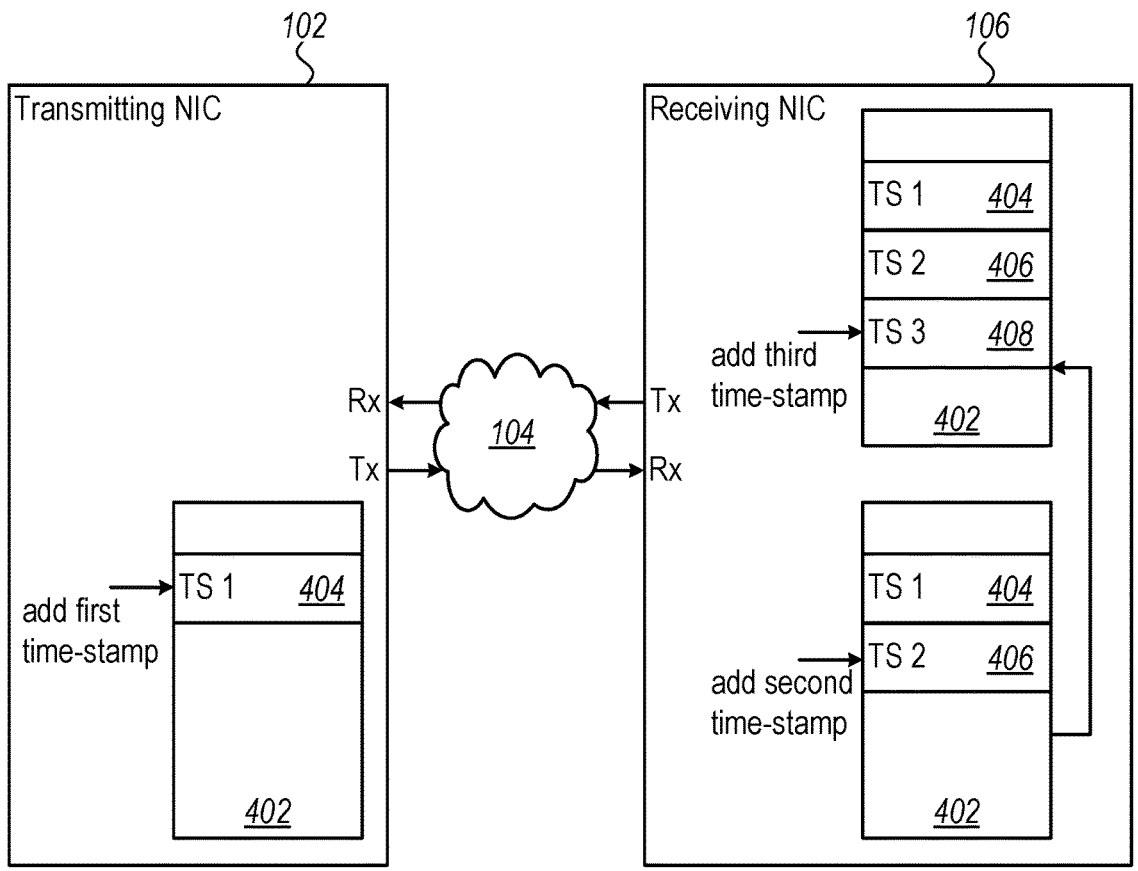
FIG. 4 is a block diagram that schematically illustrates a Round-Trip-Delay (RTT) Measurement flow in a network, according to embodiments of the present invention.

FIG. 4 is a block diagram that schematically illustrates an RTT Measurement flow in a network, according to embodiments of the present invention. A Transmitting NIC 102 sends an RTT measurement packet 402, which comprises a first timestamp (T1) 404, indicating the time in which the packet is transmitted. The packet then transverses through Network 104 and arrives at a Receiving NIC 106. The Receiving NIC routes the packet back to the sender, adding a second timestamp (T2) 406 when the NIC receives the packet and a third timestamp (T3) 408 when the NIC sends the returned packet. According to embodiments, RTT response in the receiving NIC is fast, executed by software with no scheduling or queuing.

When the return packet arrives at the Transmitting NIC, the Transmitting NIC can derive the three components of the round-time delay:

Time delay from the Transmitting NIC to the Receiving NIC—T2−T1;

Time delay within the Receiving NIC, from Ingress to Egress ports—T3−T2;

Time from the Receiving NIC to the Transmitting NIC—the difference between the time that the packet is received at the Transmitting NIC and T3.

It should be noted that the RTT packets may have additional fields that are not shown, such as the ID of the Transmitting and/or the Receiving NICs, the Ingress and Egress ports, etc.

Thus, according to embodiments of the present invention, a Transmitting NIC can be configured to initiate RTT measurements, provided that the Receiving NIC supports RTT measurements. The measured RTT can then be used as a parameter for the CC algorithms that the Transmitting NIC may run.

As would be appreciated, the structure of the RTT measurement packet as illustrated in FIG. 4 is cited by way of example. RTT measurement packets in accordance with the disclosed techniques are not limited to the description hereinabove. In alternative embodiments more timestamps as well as other fields may be added. In an embodiment, the Receiving NIC may add a time difference rather than the absolute time to the RTT measurement packet.

User Programmability

In embodiments according to the present invention, the CC algorithms that the CCP runs may be changed from time to time by a user of the NIC, including changes that are done in-site.

Figure 5:
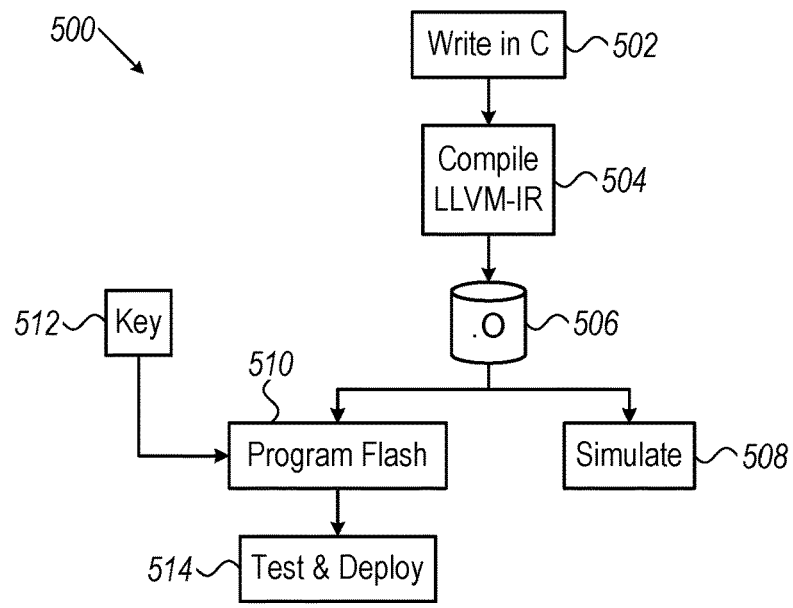
FIG. 5 is a flow chart that schematically describes the development of Congestion Control (CC) software to be run by a Congestion Control Processor (CCP) in a NIC, in accordance with embodiments of the present invention.

FIG. 5 is a flow chart that schematically describes the development of CC algorithm to be run by the CCP, in accordance with embodiments of the present invention. The flow is executed by a user (typically a programmer).

The flow starts at a Writing-C-Code step 502, wherein the user writes the CC algorithm in C code. The user must obey some rules, like fixed context structure, fixed input and output APIs. The user then, in a Compiling step 504, compiles the C code, using, for example, LLVM Intermediate Representation (LLVM-IR) compiler 504. The output of the compiler is an Object Code 506.

The user can then run a simulator 508 to check how the algorithm would perform in a network. After the simulation (or instead of the simulation) the user executes a Programming Flash step 510, wherein the user programs a Flash (or another type of NVM) with the code generated by the compiler. In the example embodiment of FIG. 5 the Flash is protected, and the user must provide a Security Key 512 to enable writing into the Flash. Lastly, in a Testing/Deploying step 514, the user tests the algorithm and, if good, deploys the CC code in NIC units.

As would be appreciated, the CC development flow illustrated in FIG. 5 and described herein is cited by way of example. In alternative embodiments other suitable development flows may be used, including, for example, Python code programming and the use of other compilers.

Figure 6:
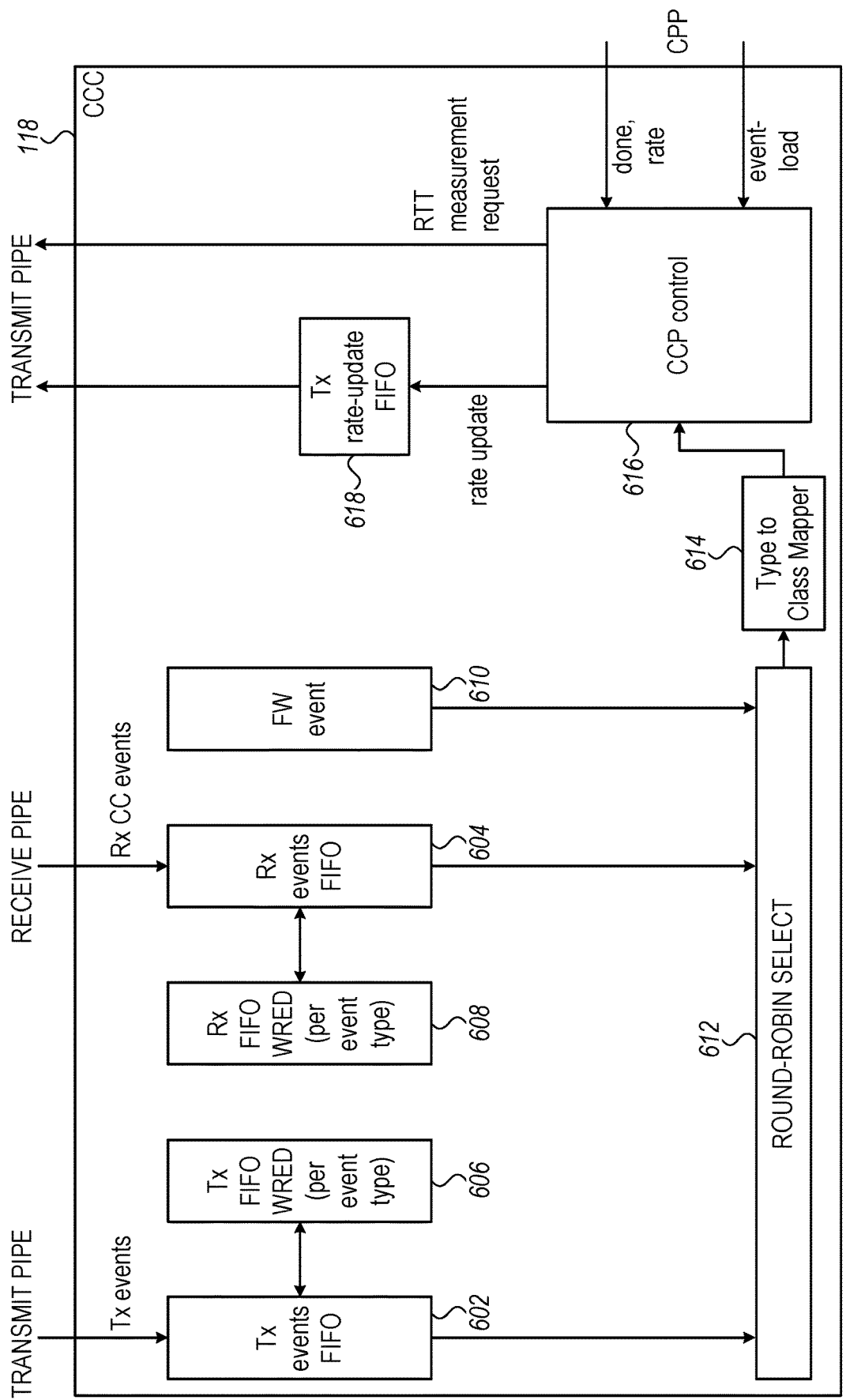
FIG. 6 is a block diagram that schematically illustrates the structure of a Congestion Control Circuitry (CCC) in a NIC, according to an embodiment of the present invention.

FIG. 6 is a block diagram that schematically illustrates the structure of a Congestion Control Circuitry (CCC) 118, according to an embodiment of the present invention. The CCC comprises:

1. a Tx-Events FIFO 602, which is configured to temporarily store Tx events that the FIFO receives from Transmit Pipe 108 (FIG. 1);
2. an Rx-Events FIFO 604, which is configured to temporarily store Rx CC events that the FIFO receives from Receive Pipe 112;
3. a Transmit-Event Weighted Random Early Drop (WRED) unit 606, and a Receive-event WRED 608, which are configured to randomly dilute events from Tx-FIFO and Rx-FIFO, respectively (on a per event-type basis);
4. a Firmware-Event unit 610, which is configured to input FW-generated CC events (for example, CC management events) to the CCP;
5. a Round-Robin Selector 612, which is configured to select CC events from the Tx Events FIFO, the Rx Events FIFO or the FW Event unit;
6. a Type-to-Class Mapper 614, which is configured to map the event type to an event class;
7. a CCP Control unit 616; and
8. a Tx-rate-update FIFO 618, which is configured to temporarily store new rates for Tx flows.

Events Types

According to the example embodiment illustrated in FIG. 6, the events that the CC receives from the Transmit and the Receive pipes are divided to seven types:

1. TX—a packet or a burst of packets has been sent by the Transmit Pipe;
2. CNP—a Congestion Notification Packet has been received from the Receiving NIC;

3. NACK—an implicit or an explicit (e.g., Out-Of-Sequence (OOS)) NACK has been received;
4. ACK—an ACK has been received;
5. RTT—an RTT measurement packet (sent by the Receiving NIC in response to the RTT measurement packet that the Transmitting NIC had sent) has been received;
6. RTT sent event—the RTT packet has been sent by the Transmit Pipe (this event is, in fact, a Tx event with RTT-send indication);
7. FW events—CC events that the FW generates.

Tx events from Transmit Pipe 108 (FIG. 1) enter Tx-Events FIFO 602. Each event comprises an event data descriptor, which includes, in addition to the event type, other information (that will be described below); e.g., the flow number, timestamps etc. To avoid FIFO overflow, WRED 606 randomly discards (drops) events as the FIFO fills up (to be further described below, with reference to FIG. 7). In a similar manner, Rx CC events from Receive Pipe 112 enter Rx-Events FIFO 604, which is protected from overflow by WRED 608.

FW event unit 610 is configured to generate CC events, which are also executed by the CCP, in response to FW instructions. According to the example embodiment illustrated in FIG. 6, Events that the FW event unit generates do not have a FIFO, and the CCP must process an FW event before subsequent FW events are received.

Round-Robin-Select unit 612 sequentially selects CC events from the Tx-events-FIFO, the Rx-Events-FIFO and the FW-Event unit and forwards the selected event to Event-Type-to-Class mapper 614. In the example embodiment illustrated in FIG. 6, the CCP handles five event classes, whereas the CC may receive up to seven event types. The Event-Type-to-Class mapper comprises a mapping table that maps more than one type to the same class. The table is programmed by the FW.

Table 1 depicts the structure of the mapping table:

TABLE 1

| Tx packet-sent event | Class_id(3 bit) |
| Tx RTT Request event | Class_id(3 bit) |
| CNP event | Class_id(3 bit) |
| NACK event | Class_id(3 bit) |
| ACK event | Class_id(3 bit) |
| RTT event | Class_id(3 bit) |
| FW event | Class_id(3 bit) |

Type to Class Mapper 614 sends an event indication, which includes the event class, to CCP Controller 616. With each event, the Type to Class Mapper sends information pertaining to the event. Table 2 lists the information that the Type to Class Mapper sends with each event (some more information, which is not indicated below, may be sent in Tx events and in FW events):

TABLE 1

| Field | Event Types | Description |
|---|---|---|
| host_id | General | Host processor index |
| gvmi | General | Global Virtual Machine index |
| flow_tag | General | Flow index (or a hash function thereof) |
| ev_type | General | The type of the event |
| ev_subtype | General | valid only on FW and NACK event types. |
| interface | General | port number |

TABLE 1-continued

| Field | Event Types | Description |
|---|---|---|
| flag: override | General | The last TX request has been overridden |
| flag: rtt_packet_sent | General | An RTT measurement packet has been sent |
| flag: ack_expected | General | An ACK to the sent burst is expected |
| SN | General | Tx - last sent serial number; RX - SN From packet ACK/NACK |
| timestamp | General | Three timestamps are sent in an RTT event |

The CCP Control coalesces groups of events and activates the CCP to process the coalesced events (the structure of the CCP Control will be described hereinbelow, with reference to FIG. 8). CCP Control 616 further receives indications from the CCP when a CCP processor is done and receives the updated transmit rate as set by the CCP, along with requests to send RTT measurement packets. The CCP Control then sends the updated rate to Tx rate-update FIFO 618, which temporarily stores new rates, and sends the rates to the Transmit Pipe when the Transmit Pipe is ready to update the rate. The CCP control also sends any RTT measurement requests to the Transmit Pipe.

Figure 7:
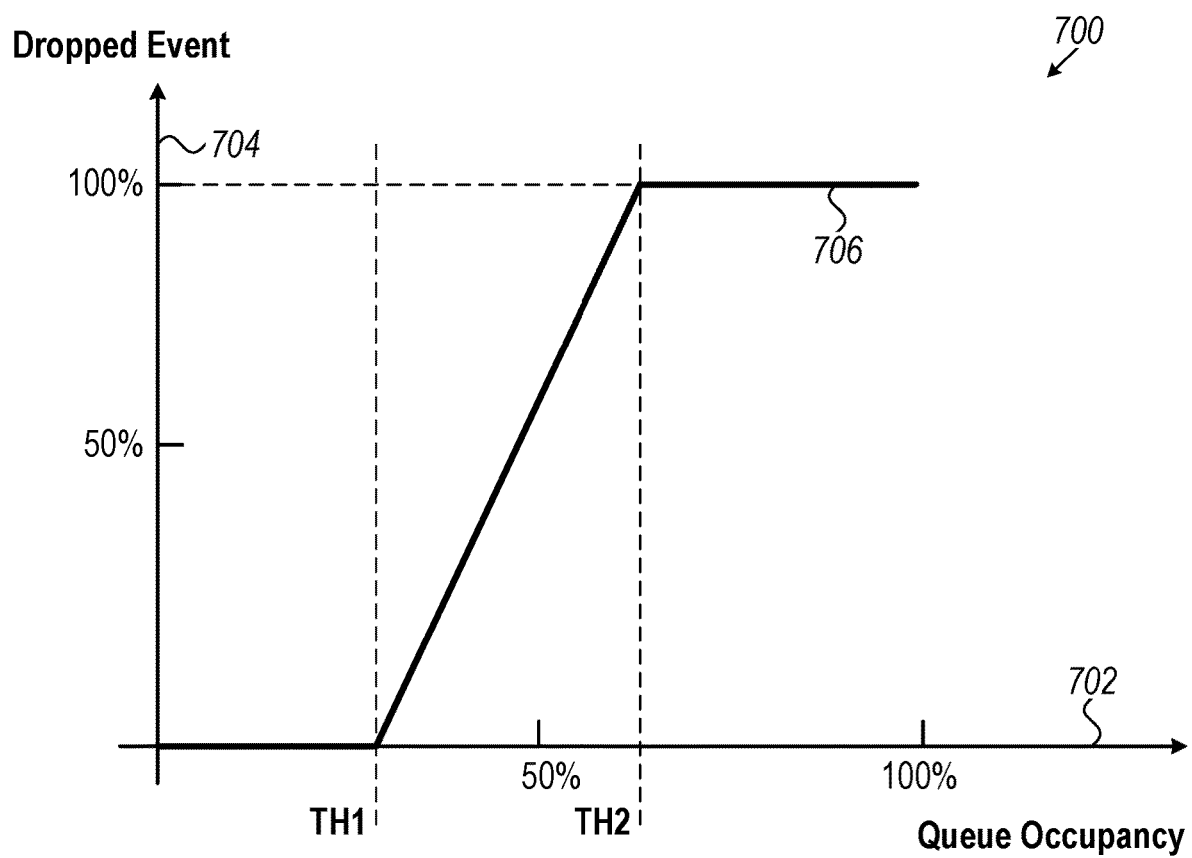
FIG. 7 is a graph that schematically illustrates the operation of Weighted Random Early Drop (WRED) units, according to embodiments of the present invention.

FIG. 7 is a graph 700 that schematically illustrates the operation of WREDs 606 and 608 (FIG. 6), according to embodiments of the present invention. A different WRED function may be defined for each event type. The graph comprises a horizontal axis 702, which represents the queue occupancy; a vertical axis 704, which represents the probability for events to be dropped; and a curve 706, which represents the drop probability function. Two parameters, which can be individually set for each event type, define the WRED function: a first threshold TH1, and a second threshold TH2.

The event drop probability is defined, as a function of the queue occupancy, as follows:
P=(occupancy<TH1) ? 0:
 (occupancy<=TH2) ? (occupancy−TH1)*Slope:
 (TH2−TH1)*Slope;
 (Slope=1/(TH2−TH1))

By carefully programming the parameters for each event type, a user can guarantee that the FIFO will not overflow, and that less important event types will be more likely to be dropped when the queue occupancy increases.

As would be appreciated, graph 700 illustrated in FIG. 7 and described hereinabove is cited by way of example. In alternative embodiments various suitable probability graphs may be used, including, for example piece-wise linear graphs with more than three segments; graphs that never reach 100% drop rate, and curved graphs.

Figure 8:
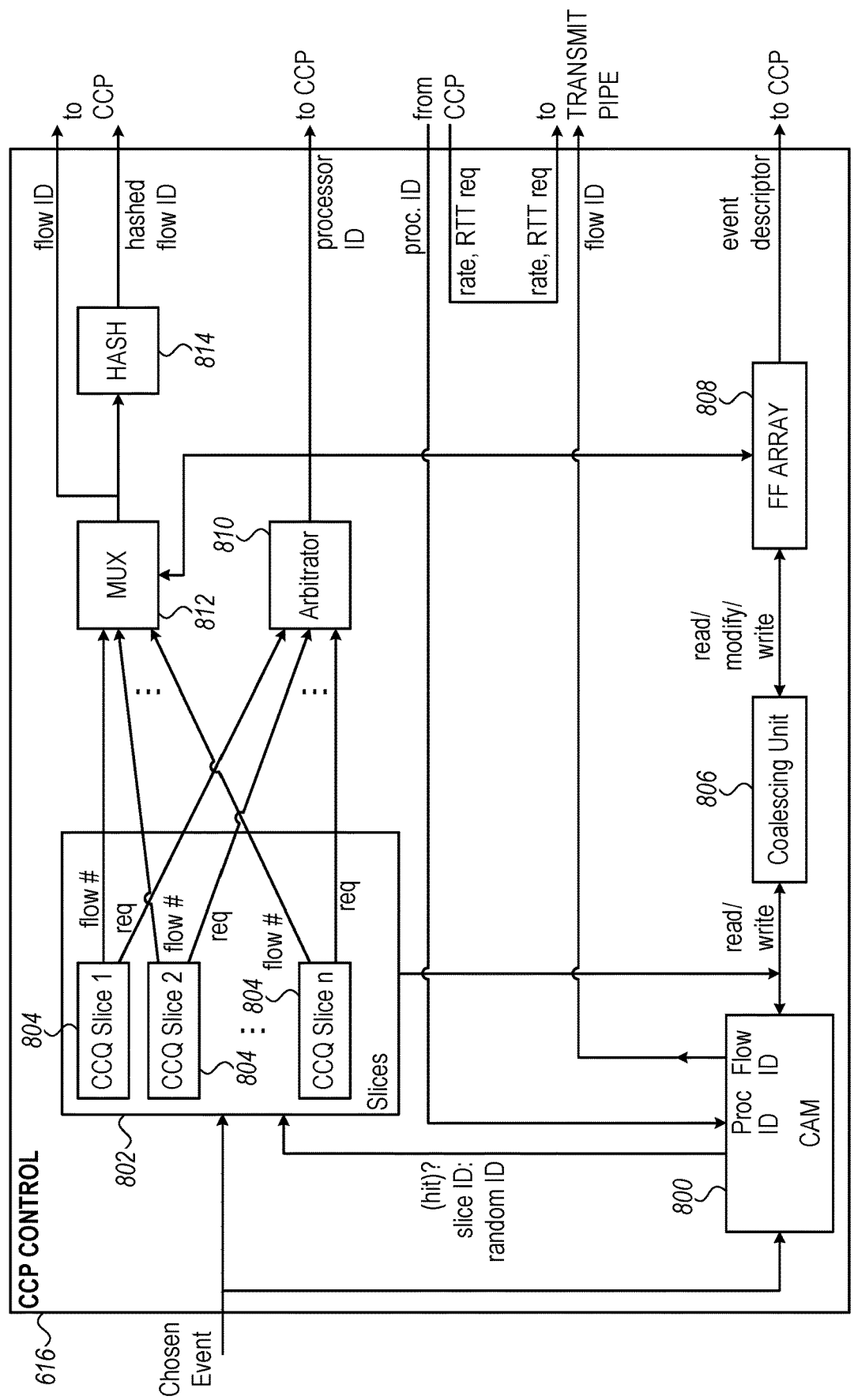
FIG. 8 is a block diagram that schematically illustrates the structure of CCP Control, according to embodiments of the present invention.

FIG. 8 is a block diagram that schematically illustrates the structure of CCP Control 616 (FIG. 6), according to embodiments of the present invention. The CCP Control comprises a Content-Addressable-Memory (CAM) 800, which is configured to locate which processor, if any, is assigned to the flow of the new event; a Slices Unit 802, comprising n CCQ slices 804, wherein n is the number of processors in the CCP; a Coalescing Unit 806, which is configured to coalesce a plurality of events; an FF Array 808, which stores the coalesced events; an Arbitrator 810, which selects a CCQ slice to be allocated to a processor; a Multiplexor 812, which selects the flow ID corresponding to the selected CCQ slice; and, a HASH 814, which adds a HASH key to the selected flow ID.

When the CCP Control receives an event from the Type-to-Class mapper, the flow ID of the event is directed to CAM 800 and to Slices 802. The CAM comprises n entries, wherein n is the number of processors. For each entry, the flow ID is stored in the Search field, and when a flow ID is asserted at the CAM input, the CAM will search for the ID. If the flow ID is stored in the CAM, the CAM will indicate the corresponding processor ID; if the flow ID is not stored, the CAM will output a random processor ID (which is not allocated to any other flow ID), and indicate "no-match" (to use CAM terminology, a "hit" occurs when there is a match to the input flow-ID, and a "miss" occurs when there is no match). CAM 800 is also configured to allow direct access to the stored flow-IDs, by specifying the processor ID and executing a Read or a Write operation.

A hit in the CAM indicates that one of the CCQ slices is allocated to the incoming event. The new event will be directed to the corresponding CCQ slice, which will request the arbiter to allocate a processor of the CCP to process the event (the request may be deferred, as we will describe hereinbelow). If there is no hit, the CCP waits until there is at least one free processor, and then randomly selects one of the free processors; the corresponding CCQ slice will be allocated to the incoming event. In that case, the CAM will write the flow ID in the search field of the entry that corresponds to the random processor ID that the CAM generated, so that searches of further events of the same flow will result in a "hit".

We will now describe Slices 802, which comprises CCQ slices 804, one slice for each CCP processor. Each CCQ Slice 804 comprises an FSM.

Figure 9:
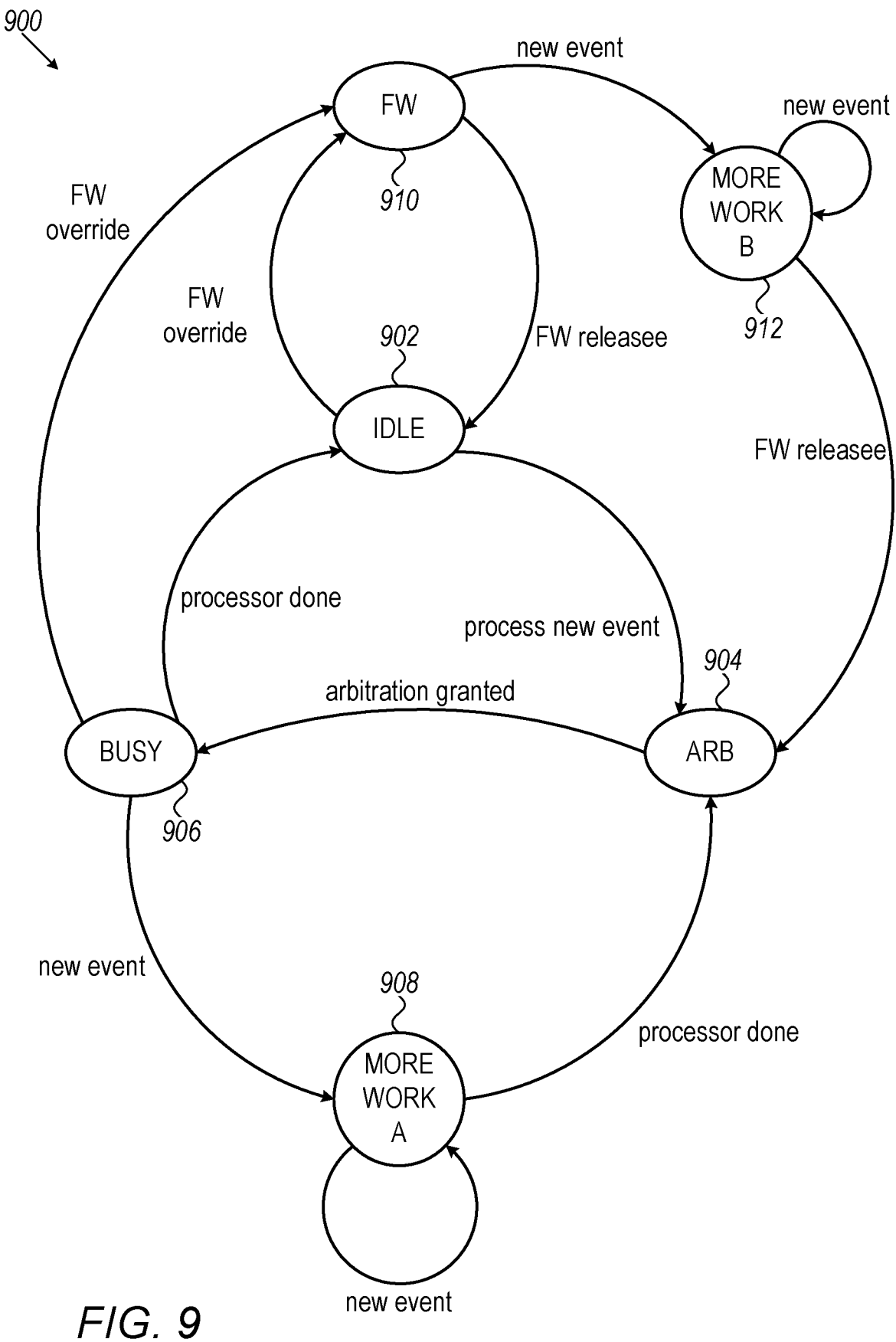
FIG. 9 is a state diagram that schematically illustrates the Finite State-Machine (FSM) of the CCP Control, in accordance with an embodiment of the present invention.

FIG. 9 is a state diagram 900 that schematically illustrates the Finite State-Machine (FSM) of each CCQ slice 804 (FIG. 8), in accordance with an embodiment of the present invention. As would be appreciated, state diagram 900 is simplified, and some details have been omitted, for clarity.

After the system is reset, the FSM is at an Idle state 902, waiting for a request to process a new event. When a new event is received, the FSM enters an Arbitration State 904, wherein the CCQ slice requests arbitration (from Arbitrator 810, FIG. 8). When the Arbitrator grants the request, the FSM enters a Busy state 906, wherein the corresponding CCP processor will run the CC algorithm with the new event. When the FSM receives a Processor Done indication (that corresponds to the current processor) from the CCP, if the FSM is still in the Busy state, the FSM will re-enter Idle state 902.

When a new event is received while the processor is busy with a previous event, the new event will be coalesced, and the FSM should not enter the IDLE state. In term of the FSM, when the FSM is in Busy state 906 and a new event is received, the FSM enters a More-Work-A state 908 (and stays in More-Work-A state if further new events are received). When the CC slice receives the Processor Done indication, the FSM will enter Arbitration state 904, and will re-arbitrate against other contender-slices that wish to access a processor. (In some embodiments, More Work state 908 is a simplified presentation of an additional mechanism which coalesces additional events that are received when the FSM is busy; in an embodiment, additional events may be received also when the FSM is in ARB state 904.)

As discussed above, the Firmware may wish to override the CC algorithms, and calculate the rate in software (that is—not in a CCP processor). The FW drives two signals—an FW-Override signal, which indicates that the FW requests to run a CC code, and FW-release, indicating that arbitration between CC events may continue.

When the FSM is in Idle state 902 or in Busy state 906, and the FW asserts the FW-Override indication, the FSM will enter an FW state 910, waiting for the FW to finish. When the FW asserts the FW release signal, if the FSM is still in the FW state, the FSM will enter Idle state 902.

If, when the FSM is in FW state 910, a new event is received (and coalesced), the FSM will enter a More-Work-B state 912 (and will remain at More-Work-B state if more events are received). If the FSM is in More-Work-B state and the FW asserts the FW-Release signal, the FSM will enter Arbitration State 904, and re-arbitrate.

We now return to FIG. 8. Arbitrator 810 determines which of CCQ slices should be allocated to a CCP processor. According to the example embodiment illustrated in FIG. 8, one processor at a time (e.g., per clock cycle) can be allocated. CCQ slices 804 are also configured to output the corresponding flow IDs to a Mux 812, which selects the flow ID that corresponds to the processor that the Arbitrator selects. The CCP Control then outputs both the processor ID and the flow ID to a processor in the CCP, along with a hashed flow-ID, which is generated by a HASH 814.

Coalescing

FF array 808 comprises n slices (n is the number of processors in the CCP). Each FF slice comprises five entries, one for each class. Each entry comprises event data. When CCP Control 616 receives an event and the processor that is assigned to process events pertaining to the corresponding flow is busy, the CCP Control coalesces the event into the corresponding entry in the FF array. When the CCP control receives further events of the same flow and the same class, the CCP Control will update the corresponding entry in the FF Array.

Table 3 lists the fields in each entry. Some fields are used by specific event classes only, and some are used in all classes:

TABLE 2

| Field | Event Class | Width | Description |
| --- | --- | --- | --- |
| valid | all | 1 bit | Data is valid Set when the current event class of the current processor is active |
| Timestamp (in 8 nsec resolution) | all | 32 bits | Timestamp of last handled event |
| SN (Serial Number) | all | 24 bits | SN of last handled event |
| Port number | all | 1 bit | The port of the last handled event |
| Event Type | all | 3 bits | Event type of the entry |
| Gvmi (global virtual machine index) | all | 16 bits | Gvmi of the event |
| Host_id | all | 4 bits | Host_id of the event |
| Flow tag | all | 32 bits | The flow tag of the event |
| Ack_expected | all | 1 bit | Sent from Tx for flows that expect ACK |
| FW_parameters | FW | 64 | Parameters from FW |

TABLE 2-continued

| Field | Event Class | Width | Description |
|---|---|---|---|
| FW event subtype | FW | 3 | FW event sub type |
| Byte count | Tx | 32 | Total number of bytes in coalesced events |
| Packet count | Tx | 16 | Total number of packets in coalesced events |
| First_timestamp | Tx | 32 | Timestamp of the first coalesced event |
| Num_coalesced | ACK/NACK/CNP | 16 | Number of coalesced events |
| First_timestamp | ACK/NACK/CNP | 32 | Timestamp of the first coalesced event |
| First SN (serial number) | ACK/NACK/CNP | 32 | SN of first event |
| req_send_timestamp | RTT | 32 | RTT first timestamp |
| req_recv_timestamp | RTT | 32 | RTT second timestamp |
| resp_send_timestamp | RTT | 32 | RTT third timestamp |

The table is similar to Table 2, but comprises additional fields, and some of the fields are defined differently. Coalescing is done by Coalescing Unit 806, which receives the event and updates the corresponding segment in FF Array 808.

When the CCP completes an algorithm run, the CCP sends to the CCC an indication which comprises the processor ID, the calculated rate and, possibly, a request to send an RTT measurement packet. The processor ID input from the CCP is coupled to the CAM, which reads the flow ID that corresponds to the processor ID. The CCP Control then sends to the Transmit Pipe the flow ID, the rate and, optionally, a request to send an RTT packet.

In summary, the example embodiment illustrated in FIGS. 6, 7, 8 and 9 queues events, dropping some of them if congested, and allocates the events to processors. Events of the same type may be coalesced if there is no available processor, the coalesced events being stored in an FF array. A CAM is used to quickly locate a processor according to the flow tag. There is an FSM for each processor, and an arbitrator which selects which event or coalesced event will be assigned to an available processor.

As would be appreciated, the structures of CCC 118 and CCP-control 616 illustrated in FIG. 6, 8 and described hereinabove are cited by way of example. In alternative embodiments other suitable structures may be used, including, for example, different arbitration schemes, different event-drop mechanism (or CCC units wherein no events are dropped). In some embodiments, there is not type to class mapper, and each event type is assigned an FF array entry. The various fields of the event and of the coalesced evets may be different and comprise different fields. In an embodiment, the CCP may use the flow ID as part of its context, and thus send the flow ID directly to the Transmit Pipe.

The configuration of the NICs, including units and sub-units thereof, illustrated in FIGS. 1, 2, 6, 8 and 9, are example configurations that are depicted purely for the sake of conceptual clarity. Any other suitable configurations can be used in alternative embodiments. The different NIC elements may be implemented using suitable hardware, such as in one or more Application-Specific Integrated Circuit (ASIC) or Field-Programmable Gate Arrays (FPGA), using software, or using a combination of hardware and software elements.

CCP 116 typically comprises a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
a receive (RX) pipeline, configured to receive packets from a network and process the received packets;
a transmit (TX) pipeline, configured to transmit packets to the network;
hardware-implemented circuitry, configured to derive from at least some of the packets transmitted to the network and from at least some of the packets received from the network, multi-field entries representing congestion Control (CC) events; and
a congestion-control programmable processor, which is configured by software to receive the multi-field entries from the hardware-implemented circuitry, and to calculate a transmission rate of the packets transmitted to the network by the TX pipeline responsively to the multi-field entries.

2. The network adapter according to claim 1, and comprising a direct hardware-implemented point-to-point interface configured to transfer at least some of the multi-field entries representing CC events from the hardware-implemented circuitry to the congestion-control processor, without operating system invocation.

3. The network adapter according to claim 1, wherein the hardware-implemented circuitry comprises an event queue configured to queue the multi-field entries representing CC events, and circuitry configured to pre-process the queued multi-field entries representing CC events.

4. The network adapter according to claim 3, wherein the circuitry is configured to discard one or more of the queued multi-field entries representing CC events, and to provide to the congestion-control processor only the multi-field entries representing CC events that were not discarded.

5. The network adapter according to claim 3, wherein the circuitry is configured to coalesce two or more of the queued multi-field entries representing CC events, and to provide the coalesced multi-field entries representing CC events to the congestion-control processor.

6. The network adapter according to claim 1, wherein the congestion-control processor supports an Application Programming Interface (API) for receiving user-defined Congestion-Control (CC) software code, and to calculate the transmission rate by running the CC software code.

7. The network adapter according to claim 1,
wherein the hardware-implemented circuitry is further configured to transmit via the TX pipeline a first Round-Trip Time (RTT) packet, and to receive via the RX pipeline a second RTT packet that was sent from a peer network adapter in response to the first RTT packet,
and wherein the congestion-control processor is configured to estimate, based on the first and second RTT packets, a round-trip propagation time between the network adapter and the peer network adapter, and to calculate the transmission rate depending on the round-trip propagation time.

8. The network adapter according to claim 1, wherein the congestion-control programmable processor comprises a dedicated processor tightly coupled to communication ports.

9. The network adapter according to claim 1, wherein the congestion-control programmable processor comprises a plurality of processors, and wherein the hardware-implemented circuitry is configured to indicate in at least some of the multi-field entries a specific processor of the plurality of processors that is handling the flow to which the multi-field entry relates.

10. The network adapter according to claim 1, wherein the congestion-control programmable processor (CCP) comprises a plurality of processors, and wherein the hardware-implemented circuitry is configured to manage an array which includes an entry for every processor of the CCP and every event class, and in each entry stores accumulated data of all coalesced events that correspond to the processor and class of the entry.

11. A network adapter, comprising:
a receive (RX) pipeline, configured to receive packets from a network and process the received packets;
a transmit (TX) pipeline, configured to transmit packets to the network; and
hardware-implemented circuitry, configured to:
receive from the RX pipeline a first Round-Trip Time (RTT) packet sent from a peer network adapter;
generate a second RTT packet in response to the first RTT packet; and
send the second RTT packet to the TX pipeline for transmission to the peer network adapter.

12. The network adapter according to claim 11, wherein the hardware-implemented circuitry is configured to insert in the second RTT packet one or more timestamps indicative of a time difference between (i) arrival of the first RTT packet at the network adapter and (ii) departure of the second RTT packet from the network adapter.

13. A method, comprising:
using a receive (RX) pipeline of a network adapter, receiving packets from a network and processing the received packets;
transmit packets to the network using a transmit (TX) pipeline of the network adapter;
using hardware-implemented circuitry in the network adapter, deriving from at least some of the packets transmitted to the network and from at least some of the packets received from the network, multi-field entries representing congestion Control (CC) events; and
using a congestion-control programmable processor in the network adapter, which is programmed by software, receiving the multi-field entries from the hardware-implemented circuitry, and calculating a transmission rate of the packets transmitted to the network by the TX pipeline responsively to the multi-field entries.

14. The method according to claim 13, and comprising transfer at least some of the multi-field entries representing CC events from the hardware-implemented circuitry to the congestion-control processor over a direct hardware-implemented point-to-point interface, without operating system invocation.

15. The method according to claim 13, and comprising queuing the multi-field entries representing CC events in an event queue in the hardware-implemented circuitry, and pre-processing the queued multi-field entries representing CC events.

16. The method according to claim 15, wherein pre-processing the queued multi-field entries representing CC events comprises discarding one or more of the queued multi-field entries representing CC events, and providing to the congestion-control processor only the multi-field entries representing CC events that were not discarded.

17. The method according to claim 15, wherein pre-processing the queued multi-field entries representing CC events comprises coalescing two or more of the queued multi-field entries representing CC events, and providing the coalesced multi-field entries representing CC events to the congestion-control processor.

18. The method according to claim 13, wherein calculating the transmission rate comprises receiving user-defined Congestion-Control (CC) software code using an Application Programming Interface (API), and calculating the transmission rate by running the CC software code.

19. The method according to claim 13,
further comprising, using the hardware-implemented circuitry, transmitting via the TX pipeline a first Round-Trip Time (RTT) packet and receiving via the RX pipeline a second RTT packet that was sent from a peer network adapter in response to the first RTT packet, and, using the congestion-control processor, estimating, based on the first and second RTT packets, a round-trip propagation time between the network adapter and the peer network adapter,
wherein calculating the transmission rate comprises calculating the transmission rate depending on the round-trip propagation time.

20. A method, comprising:
using a receive (RX) pipeline in a network adapter, receiving packets from a network and processing the received packets;
transmitting packets to the network using a transmit (TX) pipeline of the network adapter; and
using hardware-implemented circuitry in the network adapter:
receiving from the RX pipeline a first Round-Trip Time (RTT) packet sent from a peer network adapter;
generating a second RTT packet in response to the first RTT packet; and
sending the second RTT packet to the TX pipeline for transmission to the peer network adapter.

21. The method according to claim 20, wherein generating the second RTT packet comprises inserting in the second RTT packet one or more timestamps indicative of a time difference between (i) arrival of the first RTT packet at the network adapter and (ii) departure of the second RTT packet from the network adapter.

* * * * *